(No Model.)

J. H. STANTON.
COTTON PLANTER.

No. 321,321. Patented June 30, 1885.

Witnesses:
Henry C. Hazard.
Jas. E. Hutchinson.

Inventor:
John H. Stanton
by Pandle and Russell
Attorneys.

UNITED STATES PATENT OFFICE.

JOHN H. STANTON, OF NEWBORN, GEORGIA.

COTTON-PLANTER.

SPECIFICATION forming part of Letters Patent No. 321,321, dated June 30, 1885.

Application filed May 17, 1884. (No model.)

*To all whom it may concern:*

Be it known that I, JOHN H. STANTON, of Newborn, in the county of Newton, and in the State of Georgia, have invented certain new and useful Improvements in Cotton-Planters; and I do hereby declare that the following is a full, clear, and exact description thereof, reference being had to the accompanying drawings, in which—

Figure 1:
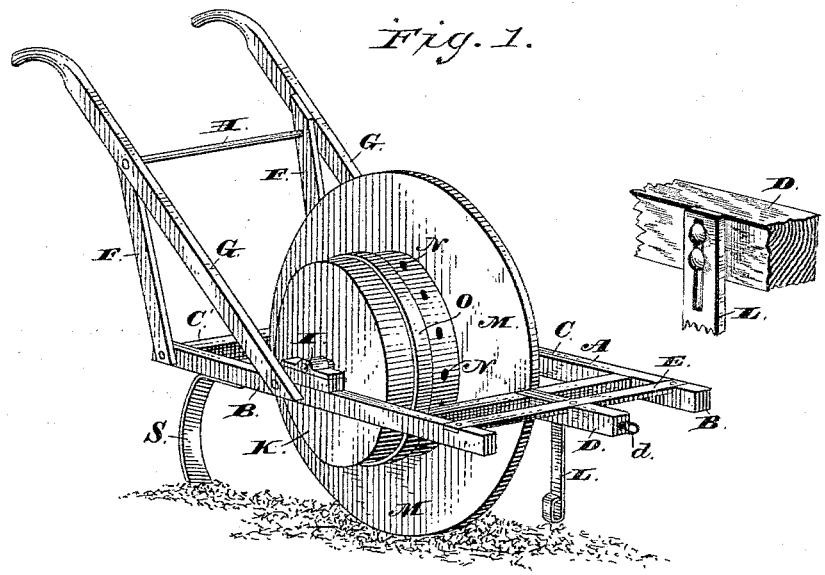
Figure 2:
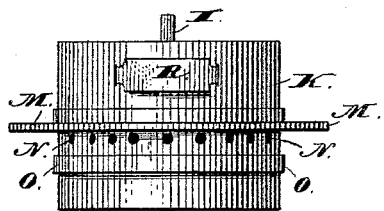
Figure 3:
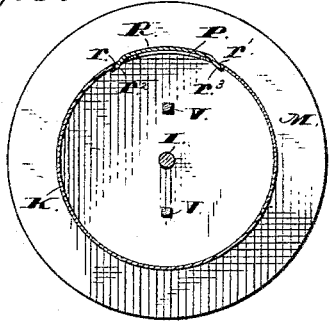

Figure 1 shows a perspective view of my improved cotton-planter; Fig. 2, a plan view of the drum and wheel removed; and Fig. 3, a detail view of the closing device for the opening in the drum through which seed can be introduced into it.

Letters of like name and kind indicate like parts in the several figures.

The object of my invention is to provide an improved cotton-planter and to this end; it consists of the construction, arrangement, and combination of parts, as hereinafter described, and more specifically pointed out in the claims.

In the drawings, A designates the frame of the machine, which consists of the longitudinal side bars, B B, connected near their front and rear ends by the cross-bars or beams C C', so as to form a rectangular frame.

To the bar C is attached the rear end of the short forwardly-extending beam D, which has at its forward end a hook, $d$, for the attachment of suitable draft power.

A metal bar, E, is fastened at each end to the front end of one of the bars B B, and at its middle point is attached to the beam D, as shown.

To the rear ends of the side bars, B, B are attached the lower ends of standards or braces F F.

To the sides of the bars, about midway of their length, are fastened the forward ends of handles G G, extending upward and rearward. A transverse-rod, H, is fastened at each end in one of the handles, and passes through the upper ends of braces F F, which are close to the inner sides of the handles.

On an axle I, journaled at each end in one of the side bars or beams, B B, is fixed the hollow drum K, preferably made of sheet metal, though I do not limit myself to any particular material therefor. This drum forms a revolving hopper for the discharge or dropping of seed contained within it into the furrow or groove cut in the earth by the plow or furrow-cutter L. The shank of this plow or cutter is, as shown, attached to the side of the beam D, just forward of cross-bar C. The plow-foot or cutter proper is made in the shape of a loop, the metal forming it being bent inward toward the central line of the machine, upward, and outward again, as shown in the drawings. With this construction not only will a furrow be cut sufficiently deep for the planting of the seed, but the earth will be cut and pulverized as the plow-foot passes forward through it.

Attached to the peripheral surface of the drum, in a central plane at right angles to its axis, is the ring or annular flange M, forming a wheel for supporting the drum above the surface as the planter is drawn forward. With this construction, the drum being within the only supporting-wheel which is used, said drum will obviously always be maintained out of contact with the ground, no matter how uneven it may be, and the machine can be handled and turned about very easily and quickly.

The annular wheel, as shown, is fixed to the drum so as to stand in a plane through the center of the axis of the drum. A series of seed-discharge openings, N N, extends around the drum close to one side of wheel M.

The plow-foot or furrow-cutter above described, being attached to the side of beam D, stands in line with these openings. The annular flange forming the wheel may be fastened to the drum in any desired way. In Fig. 2 I show it attached by means of a short annular flange extending out from it on the side opposite from the series of discharge-openings described. The manner of attaching it, however, can be varied as desired without departing from my invention.

Upon the drum, and extending around it, is the narrow band O, which is adapted to be moved toward and over the series of openings in the drum to either partially or entirely close them to regulate the rate of discharge of seed, or stop such discharge altogether. The drum is provided with a large opening, P, to allow of the introduction of seed into it. Just beyond each end of the opening are slots $r\ r'$, into which are thrust the reduced ends $r^2\ r^3$ of the sheet-metal strip R, which extends over and serves to close the opening P. This strip, as shown, is longer than the distance between the slots r r', so that when its ends are inserted in such slots it cannot fall off or come loose. In putting it in place to close the opening P one end is first inserted into one of the slots, and the strip is then sprung or bent up until its other end can be inserted into the other slot. Then the strip is straightened out so that both its ends extend well into the slots, and its main portion closely covers the opening in the drum below it.

The strip is preferably made of metal which can be bent up sufficiently and which has elasticity enough to insure its straightening itself out, and so forcing its ends into the slots and holding them there.

To the rear ends of the side beams, B B, are attached the usual covering-arms, S S, which extend downward and inward, so as to turn the upturned earth on the side of the furrow inward over the seed dropped into the latter from the drum or revolving hopper.

The shank of the plow-foot L is preferably slotted at its upper end, and through the slot the fastening-screws extend into the beam. With this construction the foot can be adjusted up and down.

Instead of the foot, as shown, one of the ordinary forms of plow-shares can be used, slotted at its lower end for the attachment of an adjustable hoe or foot.

Within the drum are two bars, V V, extending parallel to the axis thereof. These are for stirring up the seed within the drum. If desired, both the wheel and drum can be made of wood or metal.

Having thus fully set forth the nature and merits of my invention, what I claim is—

1. In a cotton-planter, the plow-foot for cutting the furrow, made in the form of a loop, with the passage therethrough extending in the direction of the travel of the machine, substantially as and for the purpose described.

2. In a cotton-planter, the plow or furrow-cutter formed of a bar bent at its lower end upward and inward to form a loop, substantially as and for the purpose described.

3. In combination with the revolving hopper provided with the charging-opening, and with slots beyond the ends of the opening, the cover for the opening, consisting of a metal plate or strip longer than the distance between the slots and with its ends adapted to enter and extend into the slots when the strip is straightened out, substantially as shown and described.

In testimony that I claim the foregoing I have hereunto set my hand this 21st day of April, A. D. 1884.

JOHN H. STANTON.

Witnesses:
   A. S. FLORENCE,
   A. M. COLTON.